United States Patent
Dunn

(10) Patent No.: US 6,701,439 B1
(45) Date of Patent: Mar. 2, 2004

(54) CALL REJECTION INTERFACE FOR INTERNET PROTOCOLS

(75) Inventor: James Patrick Dunn, Northville Township, LaSalle County, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/343,305

(22) Filed: Jun. 30, 1999

(51) Int. Cl.[7] .......................... G06F 11/30; G06F 12/14; H04L 9/00; H04L 9/32; H04L 12/66; H04L 12/50; H04K 1/00; H04M 1/56; H04M 15/06

(52) U.S. Cl. ...................... 713/201; 713/200; 380/247; 379/142.01; 379/142.05; 370/385; 370/356

(58) Field of Search .................. 379/142.01, 142.05, 379/142.16, 93.12; 380/255, 247, 271, 257; 370/356, 385, 401; 713/200, 201

(56) References Cited

U.S. PATENT DOCUMENTS

| | | | | |
|---|---|---|---|---|
| 5,867,495 A | * | 2/1999 | Elliott et al. | 370/352 |
| 6,073,176 A | * | 6/2000 | Baindur et al. | 709/227 |
| 6,308,213 B1 | * | 10/2001 | Valencia | 709/229 |
| 6,507,577 B1 | * | 1/2003 | Mauger et al. | 370/356 |

* cited by examiner

*Primary Examiner*—Thomas R. Peeso
*Assistant Examiner*—A. Nobahar

(57) ABSTRACT

The present invention is directed to a method of call rejection provided for use in connection with a data network. It includes establishing a point-of-presence which serves as a termination point for receiving calls from clients. Received calls are then multiplexed into a tunnel as separate identifiable tunnel sessions. The tunnel sessions are received at a network server of the data network. Next, it is determined for each tunnel session if access to the data network is to be denied. If access is denied, then a call rejection message is returned to the point-of-presence via the tunnel. In a preferred embodiment, the call rejection message identifies the tunnel session which is denied access and a reason for denial such that at the point-of-presence appropriate action may be taken in response thereto. In the case of suspected intrusion by an unauthorized entity, this action involves a form of deterrent and/or surveillance. In the case of internet telephony, where the data network cannot successfully handle the call, the action involves rerouting the call via a crank back.

29 Claims, 3 Drawing Sheets

CALL REJECTION INTERFACE FOR INTERNET PROTOCOLS

BACKGROUND OF THE INVENTION

The present invention relates to the art of internet protocols and, more specifically, to providing call rejection in the case of potential hackers or faulty internet telephony.

Typically, internet and data networks use a number of challenges and password routines on dial-up connections to ensure that hackers or otherwise unauthorized users cannot enter these networks using an assumed identity of another. On privileged access connections, such as wide area network (WAN) connections using frame relay or asynchronous transfer mode (ATM), the users are often assumed to be secure users or within the privileges defined by a firewall. The firewall is a sub-system of computer software and/or hardware that intercepts data packets before allowing them into or out of a data network, such as a local area network (LAN). The firewall makes decisions on whether or not to allow data to pass based upon a security policy.

Likewise, with tunneling protocols that allow dial-up connections to be transferred over WANs, a mixture of dial-up challenges, passwords and fraud detection programs are used to protect the network from hackers. Generally, tunneling, also known as encapsulation, refers to the practice of encapsulating a message from one protocol in a second, and using the facilities of the second protocol to traverse some number of network hops. In other words, the data packets are "wrapped" with another protocol so that they can pass through firewalls and then "unwrapped" once they reach their destination. This means that the user has a way to securely work through firewalls so that he can access network resources as if the firewalls do not exist.

Typically however, in these tunneling protocols, such as layer 2 tunneling protocol (L2TP), which is the emerging Internet Engineering Task Force (IETF) standard, the tunnel is torn down when a hacker is suspected on the connection. Since many users use the same tunnel, this effects the service of many users. Moreover, it does not allow the opportunity to discover the true identity of the hacker, and typically, the data network is not otherwise equipped with the proper resources or capability to accurately identify or surveil the hacker.

Additionally, in the case of, e.g., internet telephony, when a call is faulty or a data network handling the call is otherwise unable to handle the call due to, perhaps, routing problems, congestion, or the like, the call is merely dropped. This limitation is particularly significant in the case of toll calls where an access charge is paid even though ultimately the call is dropped and not completed.

The present invention contemplates a new and improved call rejection technique and/or protocol which overcomes the above-referenced problems and others.

SUMMARY OF THE INVENTION

In accordance with one aspect of the present invention, a method of call rejection is provided for use in connection with a data network. It includes establishing a point-of-presence which serves as a termination point for receiving calls from clients. Received calls are then multiplexed into a tunnel as separate identifiable tunnel sessions. The tunnel sessions are received at a network server of the data network. Next, it is determined for each tunnel session if access to the data network is to be denied. If access is denied, then a call rejection message is returned to the point-of-presence via the tunnel.

In accordance with a more limited aspect of the present invention, the point-of-presence is established at a telephone company central office having a telecommunications switch which is connected to a public switched telephone network.

In accordance with a more limited aspect of the present invention, the call rejection message identifies the tunnel session for which access is denied.

In accordance with a more limited aspect of the present invention, the call rejection message identifies a reason for access denial.

In accordance with a more limited aspect of the present invention, the method further includes receiving and interpreting the call rejection message at the point-of-presence. Then, the switch is controlled in response to the call rejection message.

In accordance with a more limited aspect of the present invention, if the reason for access denial is suspected intrusion into the data network by an unauthorized entity, then the method further includes holding the tunnel session identified until a call trace is completed.

In accordance with a more limited aspect of the present invention, if the reason for access denial is suspected intrusion into the data network by an unauthorized entity, then controlling the switch includes at least one of the following: identifying a phone number from which the unauthorized entity is calling; marking the unauthorized entity's line; monitoring the unauthorized entity's line; disconnecting the unauthorized entity's telephone service; blocking calls from the unauthorized entity; and/or reporting activities of the unauthorized entity to governmental or regulatory authorities or operators of the data network or operators of other data networks.

In accordance with a more limited aspect of the present invention, the method further includes storing telephone numbers from which unauthorized entities attempt to access the data network.

In accordance with a more limited aspect of the present invention, if the reason for access denial is an inability of the data network to handle an internet telephony call, then controlling the switch includes cranking back the call to reroute it.

In accordance with another aspect of the present invention, a call rejection system for use by a data network is provided. It includes a local access concentrator located at a point-of-presence for the data network. A tunnel is supported at one end by the local access concentrator and at an opposing end by a network server for the data network. A call rejection interface runs on the network server. In response to a tunnel session for which access to the data network is denied, the call rejection interface returns, via the tunnel, a call rejection message to the point-of-presence.

In accordance with a more limited aspect of the present invention, the local access concentrator includes a pool of voice band modems which act as a termination point for incoming analog calls. Also included is a multiplexer which multiplexes multiple incoming calls into the tunnel as separate identifiable tunnel sessions.

In accordance with a more limited aspect of the present invention, the data network is an internet service provider.

In accordance with a more limited aspect of the present invention, the tunnel employs layer two tunneling protocol.

In accordance with a more limited aspect of the present invention, the call rejection message identifies the tunnel session and indicates a reason for denying access.

In accordance with a more limited aspect of the present invention, the tunnel includes a control channel over which the call rejection message is returned. The control channel is secure from tunnel sessions.

In accordance with a more limited aspect of the present invention, the point-of-presence is a telephone company central office having a telecommunications switch which is connected to a public switched telephone network.

In accordance with a more limited aspect of the present invention, the system further includes a control processor located at the point-of-presence. The control processor receives and interprets returned call rejection messages and in response thereto controls the switch to take a course of action based on the identified tunnel session and the reason for denying access.

In accordance with a more limited aspect of the present invention, if the reason for denying access is suspected intrusion into the data network by an unauthorized entity, then the course of action includes employing fraud detection and nuisance reporting features of the telephone switch to discourage the unauthorized entity from attempting to access the data network and to surveil the unauthorized entity.

In accordance with a more limited aspect of the present invention, the fraud detection and nuisance reporting features employed are selected from a group consisting of identification of the unauthorized entity via automatic number identification; marking the unauthorized entity's telephone line; monitoring the unauthorized entity's telephone line; disconnecting the unauthorized entity's telephone service; blocking calls from the unauthorized entity; and/or reporting activities of the unauthorized entity to governmental or regulatory authorities or operators of the data network or operators of other data networks.

In accordance with a more limited aspect of the present invention, the system further includes a database into which the control processor loads identified phone numbers from which unauthorized entity's attempt to access the data network.

In accordance with a more limited aspect of the present invention, if the reason for denying access is an inability of the data network to handle an internet telephony call, then the course of action includes employing a crank back function of the switch to reroute the call.

In accordance with another aspect of the present invention, a data network is provided to which clients gain access via a tunnel which is capable of carrying multiple tunnel sessions simultaneously and is supported on a first end by a local access concentrator located at a point-of-presence for the data network. The data network includes a network server which supports a second end of the tunnel. Running on the network server is a call rejection interface. The call rejection interface returns, via the tunnel, a call rejection message to the point-of-presence when a tunnel session on the tunnel is denied access to the data network.

In accordance with a more limited aspect of the present invention, the call rejection message identifies the tunnel session which is denied access to the data network.

In accordance with a more limited aspect of the present invention, the call rejection message identifies a reason the tunnel session is denied access to the data network.

In accordance with a more limited aspect of the present invention, the call rejection interface returns the call rejection message over a control channel of the tunnel. The control channel is secure from clients' tunnel sessions.

In accordance with another aspect of the present invention a method of handling data calls from clients to a data network is provided for when access to the data network is denied. The method includes establishing a point-of-presence for the data network. The point-of-presence serves as a termination point for data calls from clients to the data network. The data calls are then multiplexed into a tunnel as separate identifiable tunnel sessions. The tunnel is supported by the data network at an end opposite that into which the data calls are multiplexed. At the point-of-presence, a call rejection message is received when a tunnel session is denied access to the data network. The call rejection message is received over the tunnel. Ultimately, the received call rejection message is interpreted, and a telecommunications switch controlled based upon the interpretation.

In accordance with a more limited aspect of the present invention, the interpretation step includes identifying the tunnel session for which access is denied, and/or identifying a reason for its denial.

One advantage of the present invention is that it provides for identification and surveillance of suspected hackers so that appropriate action may be taken against them to deter and/or prevent unauthorized intrusion into a data network.

Another advantage of the present invention is that the legal framework of existing wire fraud statutes may be employed in dealing with suspected hackers.

Yet another advantage of the present invention is that it provides for the rerouting of internet telephony calls so that already incurred access charges are not wasted when a data network is unable to handle the call.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
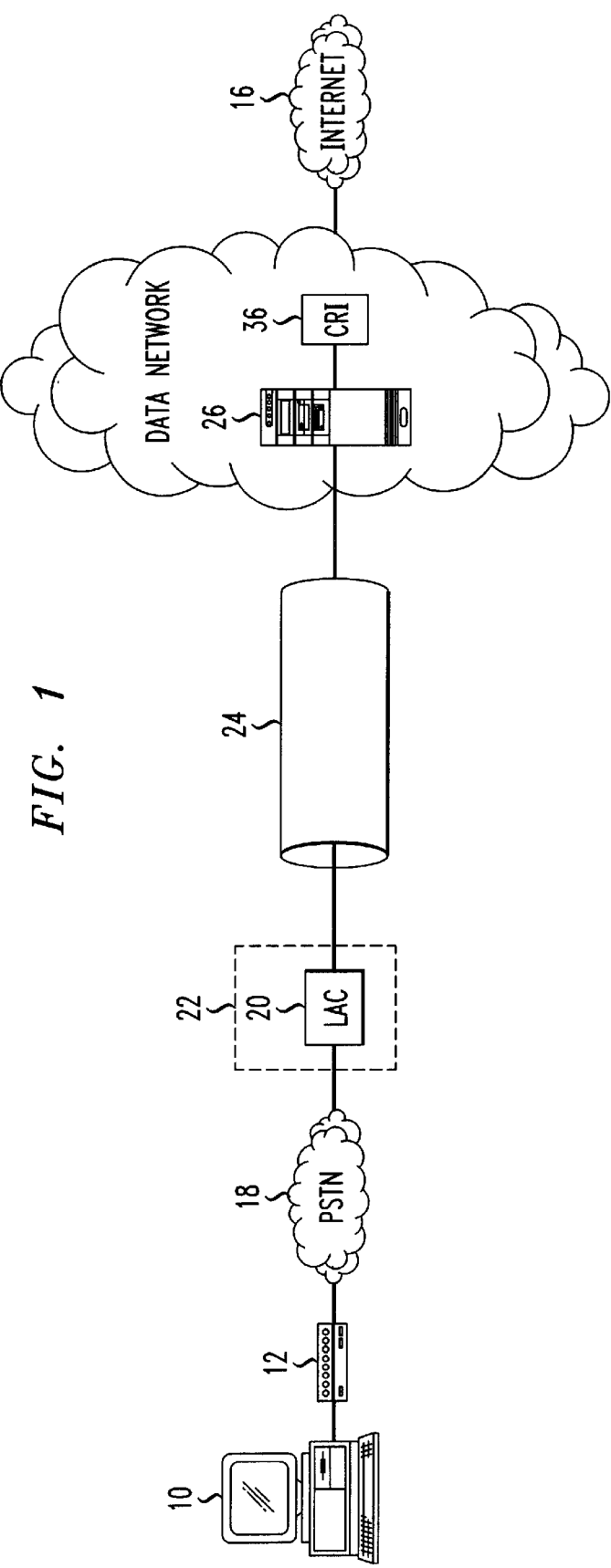
FIG. 1 is an overall diagrammatic illustration showing a telecommunications network in which the present invention operates.

With reference to FIG. 1, a client 10, such as a computer terminal or other data transmitting device, employs a modem 12 to initiate a data, internet telephony, or like call to a data network 14. For example, the data network 14 is an internet service provider (ISP) that provides access to the internet 16, or alternately it is another data network, perhaps operating a LAN or a WAN. The call is routed through a public switched telephone network (PSTN) 18 to a local access concentrator (LAC) 20 at a point-of-presence (POP) 22 for the data network 14. At the POP 22, the LAC 20 accepts the call and establishes a connection with the client 10. Then, if one does not already exist, a tunnel 24 is set up. Otherwise, an existing tunnel is employed. Generally, a tunnel 24 will exist if at least one other client 10 is already accessing the data network 14.

The tunnel 24 is supported at one end by the LAC 20 and at an opposing end by a network server (NS) 26 for the data network 14. Preferably, the tunnel 24 employs a tunneling protocol such as, e.g., layer 2 tunneling protocol (L2TP), layer 2 forwarding (L2F), point-to-point tunneling protocol (PPTP), or the like. Regardless, the tunnel 24 is a virtual pipe between the LAC 20 and NS 26.

Continuing on then, the LAC 20 establishes a session on the tunnel 24 for the client 10 and a point-to-point protocol (PPP) link is established between the client 10 and the NS 26. Generally, asynchronous PPP access is achieved when employing the modem 12 and an analog telephone system such as a PSTN. Alternately, the client 10, without a modem 12, may initiate a data, internet telephony, or like call to the data network 14 and be routed via an integrated services digital network (ISDN) to the LAC 20 for synchronous PPP access. Either way, commonly, a plurality of clients 10 are accessing the data network 14 at any given time and the tunnel 24 concurrently carries multiple sessions.

The tunnel 24 also preferably includes a control channel which is secure from any tunnel sessions thereon. It is secure in the sense that a client 10 is not privy to or aware of communications sent over the control channel between the LAC 20 and NS 26, i.e., the communications sent over the control channel are privileged. Typically, the control channel is assigned to tunnel session zero, and in the case where a new tunnel 24 is to be set up, it is done so via the control channel.

Figure 2:
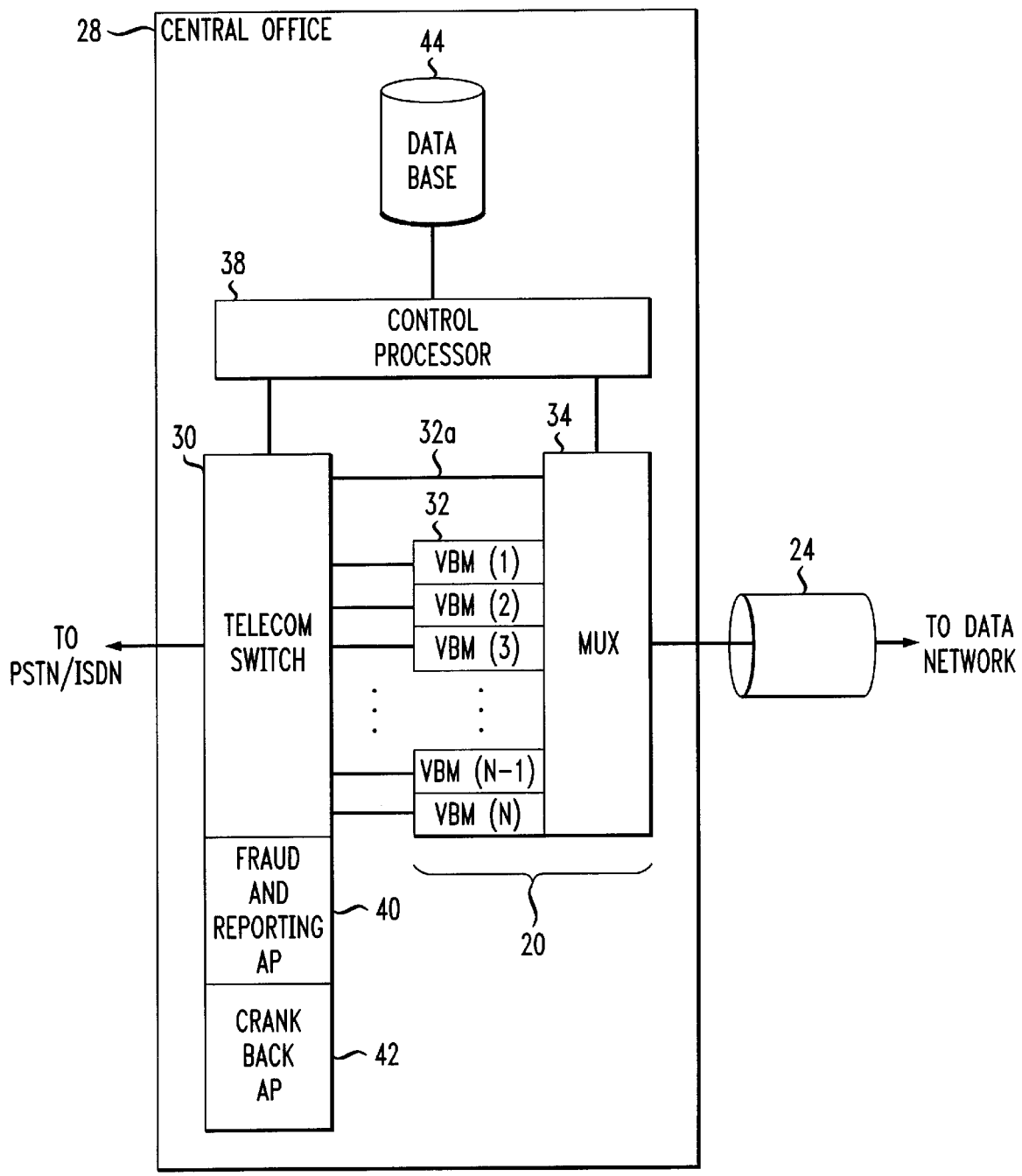
FIG. 2 is a block diagram showing a telephone company central office with a telecommunications switch and local access concentrator in accordance with aspects of the present invention; and, FIG. 3 is a flow diagram illustrating the flow of a data call and operation of a data network employing a call rejection interface in accordance with aspects of the present invention.

With reference to FIG. 2 and continuing reference to FIG. 1, in a preferred embodiment, the POP 22 is a telephone company (teleco) central office (CO) 28. The CO 28 includes a telecommunication switch 30, as is known in the art (e.g., the 5ESS® switch manufactured by Lucent Technologies), which is connected to the PSTN 18 (optionally, an ISDN or a combination of both) and routes calls to the LAC 20. To handle analog signals or calls routed over the PSTN 18, a pool 32 of voice band modems (VBMs) designated 1 through N are incorporated in the LAC 20. The VBMs serve as a termination point for the analog calls. Digital signals or calls routed over an ISDN can bypass the pool 32 of VBMs via connection 32a.

A multiplexer (MUX) 34 is also incorporated into the LAC 20. Ultimately, all the calls, analog and digital, routed to the LAC 20 enter the MUX 34. The MUX 34 multiplexes the individual calls into the tunnel 24 as separate identifiable sessions corresponding to each individual call. Preferably, the sessions are identified by a call ID imbedded in a payload header with each call ID corresponding to a separate call received by the LAC 20.

Via the tunnel 24, a call rejection interface (CRI) 36 running on the NS 26 returns to the POP 22 a call rejection message in those instances where an identified session is not to be granted access to the data network 14. Preferably, the call rejection message is carried or returned over the tunnel's control channel.

An instance where the call rejection message is returned includes, e.g., wherein after running an authentication protocol (i.e., challenge handshake authentication protocol (CHAP), password authentication protocol (PAP), or the like) the call is suspected of being from a hacker or other unauthorized entity. In this case, returning the call rejection message over the control channel is particularly advantageous in so much as the hacker will not be privy to it being sent and in turn will not be able to employ any counter measures in furtherance of his intrusion nor be able to make a haste undetected retreat.

Additionally, where the call is an internet telephony call that the data network 14 is unable to appropriately handle due to, perhaps, congestion or routing problems, then a call rejection message is also returned.

A control processor 38 located at the POP 22 (e.g., the CO 28) receives and interprets returned call rejection messages. A call rejection message preferably identifies the denied session and the reason for denial. The control processor 38, in response thereto, then controls the telecommunications switch 30 so that a predetermined or otherwise selected course of action is taken based on the identified tunnel session and the reason for denying access.

As is known in the art, telecommunication switches 30 are commonly equipped with: (1) a fraud detection and nuisance reporting application package (AP) 40 used for detecting, surveilling, and/or reporting wire fraud, telephone harassment, or the like; and (2) a crank back AP 42 used for "cranking back" or returning a call to an originating or intermediate node for the purpose of rerouting the call therefrom. These tools are called upon by the control processor 38 to achieve the desired action in response to the received call rejection message.

In the case of a suspected hacker or intrusion by an unauthorized entity, the fraud detection and nuisance reporting features 40 of the telecommunications switch 30 are employed to impede, discourage, and/or surveil the unauthorized entity. Ultimately, the hacker may be prosecuted under the wire fraud or harassment laws. Examples of available actions include: identification of the unauthorized entity via automatic number identification (ANI); marking the unauthorized entity's telephone line; monitoring the unauthorized entity's telephone line; disconnecting the unauthorized entity's telephone service; blocking calls from the unauthorized entity; and automatically reporting the activities of the unauthorized entity to governmental and regulatory authorities (e.g., the police, the Federal Communications Commission (FCC), or the like). Of course, the operators of the data network 14 are also optionally notified. Additionally, in a preferred embodiment, the control processor 38 builds a database 44 which stores information, e.g., phone numbers identified via ANI, on lines used by suspected hackers. This information is then made available to other operators of data networks so that they may also block calls from the associated phone number or take other precautionary actions as they see fit.

Moreover, after a suspected hacker has attempted to access the data network 14 and a call rejection message has been returned to the LAC 20, the data network 14 has the option of terminating or holding the tunnel session. In a preferred embodiment, the session is held to facilitate and/or allow time for a call trace. The session is held by optionally executing a delay loop or otherwise preventing the session from timing out.

In the case of the data network 14 being unable to handle an internet telephony call, the crank back feature is used to return the call to a previous node so that the call can be rerouted to its ultimate destination. In this manner, the call is not simply dropped. Rather, an alternate routing is attempted which is particularly advantageous in the case where an access charge has already been incurred.

Figure 3:
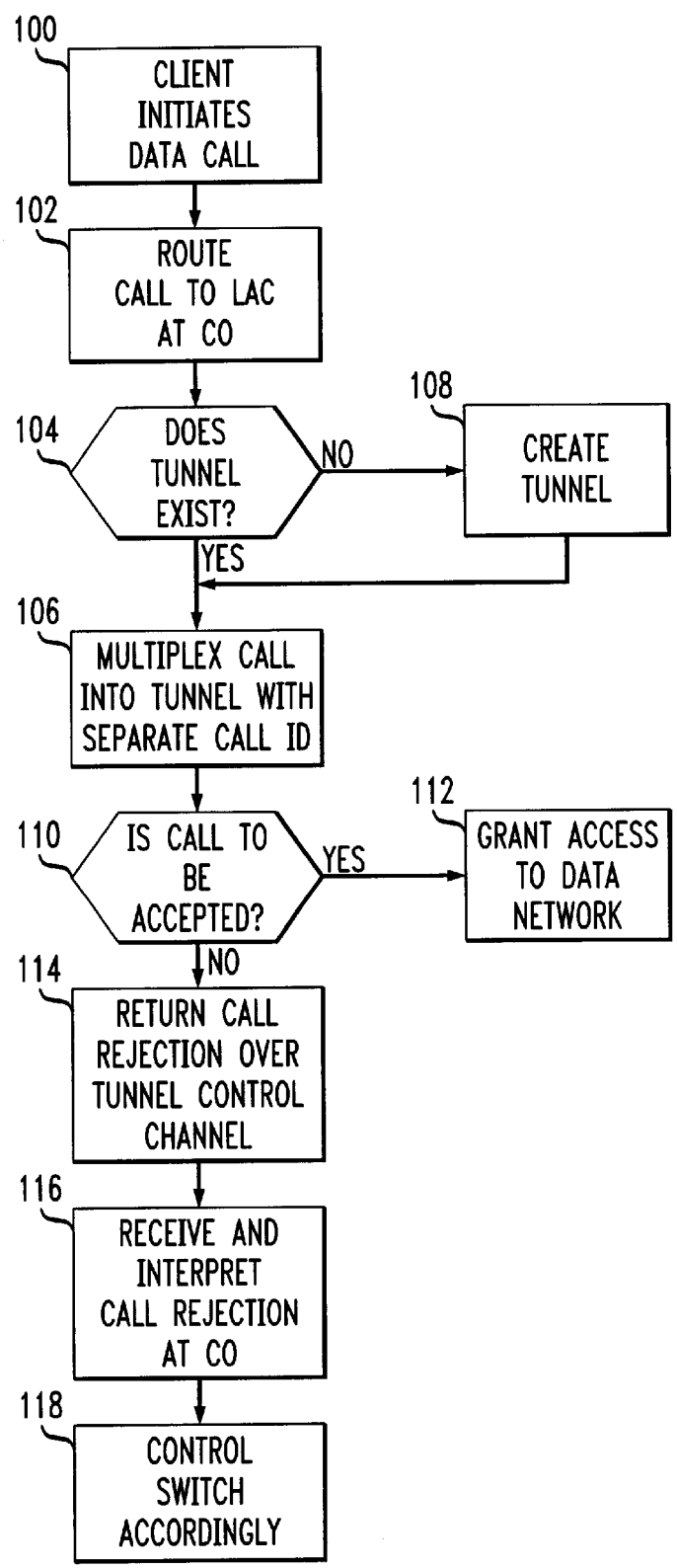

With reference to FIG. 3 and continuing reference to FIGS. 1 and 2, a flow diagram shows the progression of a data call placed to the data network 14 running the CRI 36 on its NS 26. At step 100, the client 10 initiates the data call. Next, at step 102, the data call is routed over the PSTN 18 (or alternately an ISDN) to the data network's POP 22, e.g., the teleco CO 28, where it terminates at the LAC 20.

At decision step 104, it is determined if the tunnel 24 between the LAC 20 and the NS 26 of the data network 14 already exists. If the tunnel 24 does exist, at step 106, the data call is multiplexed into the tunnel 24 as a tunnel session with its own separate and unique call identifier attached. On the other hand, if the tunnel 24 does not exist, at step 108, the tunnel 24 is first created, and then at step 106, the data call is multiplexed into the tunnel 24 as a tunnel session with its own separate and unique call identifier attached.

At the next decision step 110, it is determined if the data call is to be accepted. If the data call is to be accepted, at step 112, access to the data network 14 is granted. On the other hand, if the data call is not to be accepted, at step 114, the CRI 36 returns a call rejection message over the tunnel 24, preferably via the tunnel's control channel.

Next, at step 116, the call rejection message is received and interpreted by the control processor 38 at the CO 28. Ultimately at step 118, in response to the call rejection message, the control processor 38 controls the telecommunications switch 30 accordingly, as detailed above. In this manner, the data network 14 is able to utilize the variety of tools accompanying the telecommunications switch 30 to more appropriately deal with rejected calls based upon the reason for their rejection and/or other information incorporated in the call rejection message.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. For use in connection with a data network, a method of call rejection comprising:
   (a) establishing a point-of-presence which serves as a termination point for receiving calls from clients;
   (b) multiplexing received calls into a tunnel as separate identifiable tunnel sessions;
   (c) receiving the tunnel sessions at a network server of the data network;
   (d) determining for each tunnel session if access to the data network is to be denied; and,
   (e) returning a call rejection message to the point-of-presence via the tunnel if access is denied.

2. The method of call rejection according to claim 1, wherein the point-of-presence is established at a telephone company central office having a telecommunications switch which is connected to a public switched telephone network.

3. The method of call rejection according to claim 2, wherein the call rejection message identifies the tunnel session for which access is denied.

4. The method of call rejection according to claim 3, wherein the call rejection message identifies a reason for access denial.

5. The method of call rejection according to claim 4, further comprising:
   (f) receiving and interpreting the call rejection message at the point-of-presence; and,
   (g) controlling the switch in response to the call rejection message.

6. The method of call rejection according to claim 5, wherein if the reason for access denial is suspected intrusion into the data network by an unauthorized entity, then the method further comprises holding the tunnel session identified until a call trace is completed.

7. The method of call rejection according to claim 5, wherein if the reason for access denial is suspected intrusion into the data network by an unauthorized entity, then controlling the switch includes at least one of identifying a phone number from which the unauthorized entity is calling, marking the unauthorized entity's line, monitoring the unauthorized entity's line, disconnecting the unauthorized entity's telephone service, blocking calls from the unauthorized entity, and reporting activities of the unauthorized entity to governmental and regulatory authorities and operators of the data network and operators of other data networks.

8. The method of call rejection according to claim 7, further comprising:
   (h) storing telephone numbers from which unauthorized entities attempt to access the data network.

9. The method of call rejection according to claim 5, wherein if the reason for access denial is an inability of the data network to handle an internet telephony call, then controlling the switch includes at least cranking back the call to reroute it.

10. The method of call rejection according to claim 1, wherein the tunnel employs layer two tunneling protocol.

11. The method of call rejection according to claim 1, wherein the data network is an internet service provider.

12. A call rejection system for use by a data network, said call rejection system comprising:
   a local access concentrator located at a point-of-presence for the data network;
   a tunnel supported at one end by the local access concentrator and at an opposing end by a network server for the data network; and,
   a call rejection interface running on the network server;
   wherein, in response to a tunnel session for which access to the data network is denied, the call rejection interface returns, via the tunnel, a call rejection message to the point-of-presence.

13. The call rejection system according to claim 12, wherein the local access concentrator includes:
   a pool of voice band modems which act as a termination point for incoming analog calls; and,
   a multiplexer which multiplexes multiple incoming calls into the tunnel as separate identifiable tunnel sessions.

14. The call rejection system according to claim 12, wherein the data network is an internet service provider.

15. The call rejection system according to claim 12, wherein the tunnel employs layer two tunneling protocol.

16. The call rejection system according to claim 12, wherein the call rejection message identifies the tunnel session and indicates a reason for denying access.

17. The call rejection system according to claim 12, wherein the tunnel includes a control channel over which the call rejection message is returned, said control channel being secure from tunnel sessions.

18. The call rejection system according to claim 16, wherein the point-of-presence is a telephone company central office, said central office having a telecommunications switch which is connected to a public switched telephone network.

19. The call rejection system according to claim 18, further comprising:
   a control processor located at the point-of-presence, wherein said control processor receives and interprets returned call rejection messages and in response thereto controls the switch to take a course of action based on the identified tunnel session and the reason for denying access.

20. The call rejection system according to claim 19, wherein if the reason for denying access is suspected intrusion into the data network by an unauthorized entity, then the course of action includes employing fraud detection and nuisance reporting features of the telephone switch to discourage the unauthorized entity from attempting to access the data network and to surveil the unauthorized entity.

21. The call rejection system according to claim 20, wherein the fraud detection and nuisance reporting features employed are selected from a group consisting of identification of the unauthorized entity via automatic number identification, marking the unauthorized entity's telephone line, monitoring the unauthorized entity's telephone line, disconnecting the unauthorized entity's telephone service, blocking calls from the unauthorized entity, and reporting activities of the unauthorized entity to governmental and regulatory authorities and operators of the data network and operators of other data networks.

22. The call rejection system according to claim 21, further comprising:

a database into which the control processor loads identified phone numbers from which unauthorized entity's attempt to access the data network.

23. The call rejection system according to claim 19, wherein if the reason for denying access is an inability of the data network to handle an internet telephony call, then the course of action includes employing a crank back function of the switch to reroute the call.

24. A data network to which clients gain access via a tunnel which is capable of carrying multiple tunnel sessions simultaneously and is supported on a first end by a local access concentrator located at a point-of-presence for the data network, said data network comprising:

a network server which supports a second end of the tunnel; and, a call rejection interface running on the network server, said call rejection interface returning, via the tunnel, a call rejection message to the point-of-presence when a tunnel session on the tunnel is denied access to the data network.

25. The data network according to claim 24, wherein the call rejection message identifies the tunnel session which is denied access to the data network.

26. The data network according to claim 24, wherein the call rejection message identifies a reason the tunnel session is denied access to the data network.

27. The data network according to claim 24, wherein the call rejection interface returns the call rejection message over a control channel of the tunnel, said control channel being secure from clients' tunnel sessions.

28. A method of handling data calls from clients to a data network when access to the data network is denied, said method comprising:

(a) establishing a point-of-presence for the data network, said point-of-presence serving as a termination point for data calls from clients to the data network;

(b) multiplexing the data calls into a tunnel as separate identifiable tunnel sessions, said tunnel being supported by the data network at an end opposite that into which the data calls are multiplexed;

(c) receiving at the point-of-presence a call rejection message when a tunnel session is denied access to the data network, said receiving being done over the tunnel;

(d) interpreting the received call rejection message; and, (e) controlling a telecommunications switch based upon the interpretation of the call rejection message.

29. The method according to claim 28, wherein step (d) includes at least one of identifying the tunnel session for which access is denied, and identifying a reason for its denial.

* * * * *